June 16, 1936.  D. H. JONES  2,044,700
CLAMP FOR SCAFFOLDING
Filed Sept. 26, 1935   2 Sheets-Sheet 1
Fig. 1.
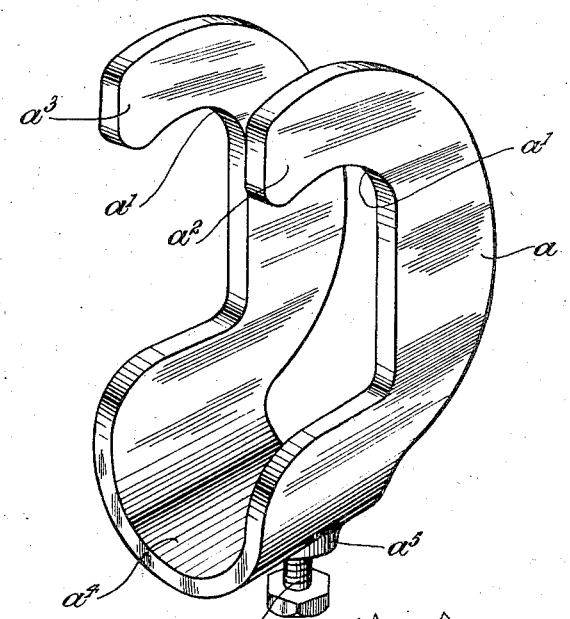
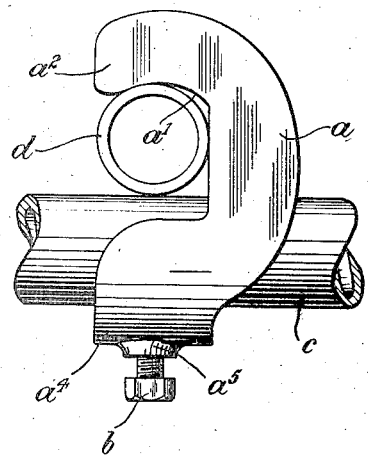
Fig. 2.
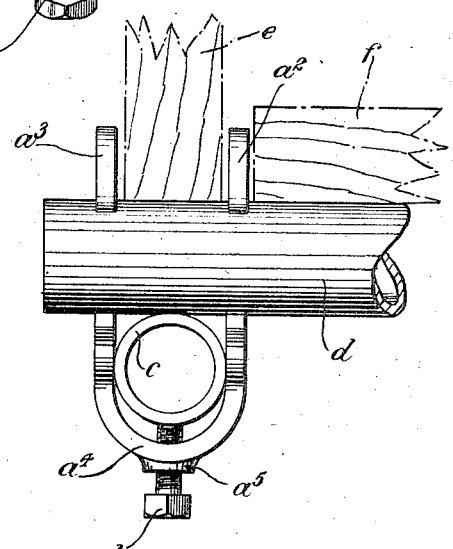
Fig. 3.
David Henry Jones
Inventor Patented June 16, 1936

2,044,700

UNITED STATES PATENT OFFICE 2,044,700

CLAMP FOR SCAFFOLDING

David Henry Jones, London, England, assignor of one-half to Scaffolding (Great Britain) Limited, London, England Application September 26, 1935, Serial No. 42,361
In Great Britain December 27, 1934

6 Claims. (Cl. 304—40)

This invention relates to a clamp for scaffolding and has for its object the provision of a clamp for clamping two scaffolding members arranged at an angle relatively to each other which clamp can be applied without threading the clamp on either of the scaffolding members.

This invention has special reference to clamping a putlog in position on a horizontal tubular member of a scaffolding erection but the invention is not limited to this application. In such a clamp it is necessary to apply the clamp without threading the clamp either on to the putlog or on to the tube, but unlike the couplers which are employed for coupling two tubes in relation to each other when both of such tubes lie in the same vertical plane, the clamp for a putlog is not required to fix the angular relationship between the putlog and the tube, but is merely required to grip the putlog to the tube so as to prevent one sliding on the other.

The most simple form of clamp is, therefore, desirable in such construction, and in accordance with the present invention the clamp is constructed as a single member of U form bent or formed from plate metal of uniform thickness which is bent upwards into a U so that the base of the U embraces the tube. The sides forming the U are recessed laterally so as to form two corresponding hooks which can be applied laterally to one of the scaffolding members and thus avoid threading so that, for instance, after the clamp has been applied below the tubular member by sliding the clamp longitudinally of the tube towards the putlog, the latter is received within the hooks, and on the clamp being tightened by the introduction of a distancing device in the trough of the U to bear between the said trough and the underside of the tube, the putlog and the tube are firmly clamped together and are held securely against slipping relatively to each other.

Clamps according to this invention are illustrated in the accompanying drawings, in which:—

Fig. 1 is a perspective view of one form of the clamping member.

Figs. 2 and 3 are two views taken at right angles to each other illustrating the application of the clamping member shown in Fig. 1 to a putlog and a scaffolding tube.

The clamping member is constructed of a single piece of sheet metal $a$ cut out at $a^1$ to provide lateral recesses in one side which forms two corresponding hook shaped ends $a^2$, $a^3$. After being cut to the required shape the metal is bent to a U-shape forming a semi-cylindrical central part $a^4$ between the two hooks $a^2$, $a^3$, which central part is rounded to receive a scaffolding tube. This central part is formed with a boss $a^5$ either integral with the central part or separate and fixed thereto. This boss is internally tapped to receive a clamping screw $b$. This screw $b$ is positioned with respect to the hook members so as to transmit a direct thrust through the inserted scaffolding members against the opposite side of the clamping device, thus securely locking all the parts in assembled relation.

In the application of the clamping member the hook shaped ends are first passed upwardly one at either side of the scaffolding tube $c$ until its central part $a^4$ embraces said tube. Now, from this position, by sliding the clamping member along longitudinally of the tube $c$, the horizontal putlog $d$ can be received within the two hook shaped ends $a^2$, $a^3$. When in this position, by turning the clamping screw, the clamp is forced downwardly until the hook-shaped ends press the putlog $d$ against the tube $c$ and thus firmly clamp them together and hold them against slipping relatively to each other. Of course, the clamp could, if desired, be fixed in the reverse position with the base of the U on top of the upper tube and the hooks under the lower tube.

As shown, the cut-away part forming the hook-shaped ends is preferably not of circular form but is arcuate at the top and is rectangular at the bottom so that it can be used for square or rectangular shaped putlogs in addition to round putlogs.

Such a clamp enables a toe board $e$ to be accommodated between the two hook-shaped ends and also acts as a stop for the scaffold boards $f$ supported on the putlog.

Figure 4:
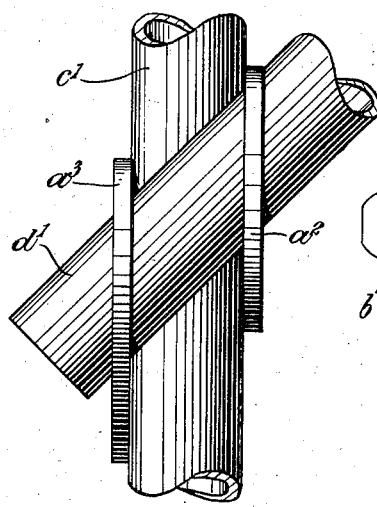
Figs. 4 and 5 are two views taken at right angles to each other of another form of clamping member shown applied to an upright and a diagonal scaffolding tube.
Figure 5:
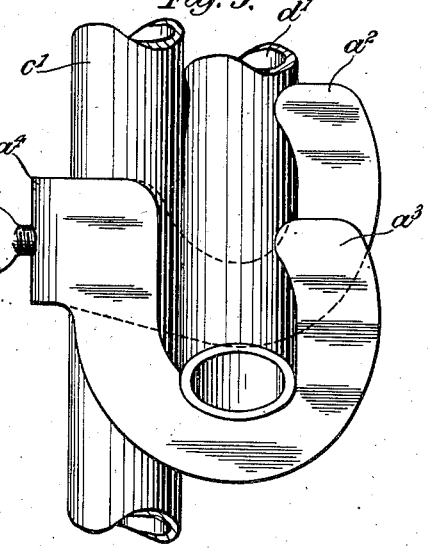

For application to scaffolding tubes $c^1$, $d^1$ arranged as shown in Figs. 4 and 5 at an angle other than a right angle to each other, the clamping member would be constructed with the hook portions $a^2$, $a^3$ off set from each other.

Figure 6:
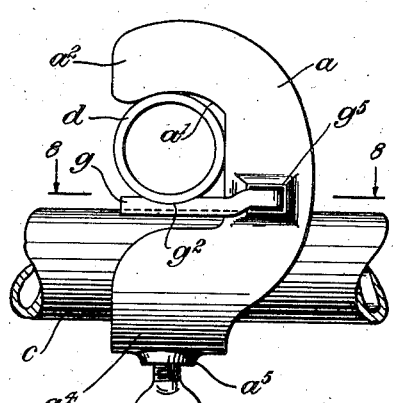
Figs. 6 and 7 are similar views to Figs. 2 and 3 but illustrate the application of a chair to the clamping member.
Figure 7:
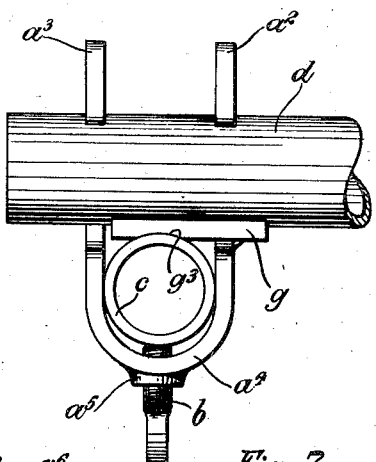
Figure 8:
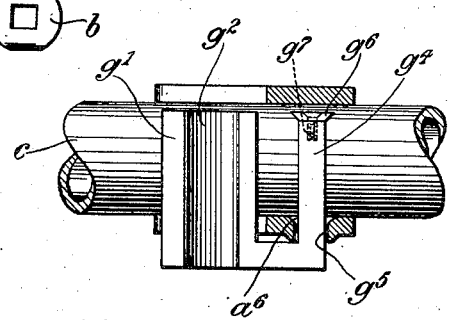
Fig. 8 is a section on the line 8—8 in Fig. 6.

In the preferred arrangement shown in Figs. 6 to 8, the clamp is provided with a chair fitting $g$ arranged to fit between the two tubes when the clamp is clamped in position, and by the use of such a chair fitting it is found that the frictional resistance to load pressure between the tubes is increased to a very substantial extent. The chair fitting conveniently comprises a metal tongue $g^1$, extending at right angles to the hooks and formed on its upper and lower surfaces with recesses $g^2$, $g^3$ shaped to accommodate the tubes $c$ and $d$ which are to be united by the clamps. The tongue is connected to the clamp in such a way as to give it the small degree of freedom of movement necessary to prevent the tongue from obstructing the clamp during the placing of the latter in position on the tubes. To this end the tongue may conveniently be formed with an extended arm $g^4$ slidable in a slot $g^5$ in the hook portion $a^2$ and having its end $g^6$ shaped to fit in counter-sunk relationship in an outwardly bent portion $a^6$ on the hooks. The end $g^6$ of the tongue arm $g^4$ is made detachable and is fixed by a screw $g^7$ so that after the arm has been inserted through the slot $g^5$, the end may be attached to the arm which will then prevent its detachment from the clamp but will permit the chair to be slid endwise in order to allow the clamp to be applied to the scaffolding member in the manner hereinbefore described, and when the clamp is in position but before the clamping screw has been tightened the chair will be slid into the illustrated position so as to come in between the two tubes.

It will be understood that a chair as shown in Figs. 6, 7 and 8 may be applied to the Figs. 4 and 5 construction, provided that the recesses $g^2$ and $g^3$ are located at the required angle corresponding to that of the tubes relatively to each other.

What I claim as my invention and desire to secure by Letters Patent is:—

1. A clamp for clamping two scaffolding members together comprising a plate metal clamping member of U-shape having a central portion adapted to embrace one scaffolding member and two ends with their flat sides parallel to each other, said ends having lateral recesses in their edges on one side to form two hook portions, and said ends being off-set laterally relatively to each other adapted to be applied laterally to the other scaffolding member which is inclined obliquely to the scaffolding member embraced by the clamping member and which is received in said hook portions and a clamping device on part of said clamping member for pressing the scaffolding members against each other and against another part of the clamping member to clamp them together.

2. A clamp for clamping two scaffolding members together comprising a single plate metal clamping member of U-shape having a central portion adapted to embrace one scaffolding member and two ends, said ends having lateral recesses in their edges on one side to form two corresponding hook portions adapted to be applied laterally to the other scaffolding member, a chair movably mounted on said clamping member so that it can be moved into a position in which it permits the clamping member to be applied to the scaffolding members without threading and when applied the chair can be moved into a position between said scaffolding members and a clamping device on one end of said clamping member for applying pressure between the scaffolding members, the chair and the clamping member to clamp them together.

3. A clamp for clamping two scaffolding members together comprising a single plate metal clamping member of U-shape having a central portion adapted to embrace one scaffolding member and two ends, said ends having lateral recesses in their edges on one side to form two corresponding hook portions whereby the clamping member is adapted to be applied laterally to the other scaffolding member and having a slot in one of said hook portions, a chair formed with an extended arm slidably mounted in said slot adapted to permit the chair to be slid either into a position clear of the space between the two hook portions or into a position in between the said scaffolding members and a clamping device on one end of said clamping member for pressing the scaffolding members against each other and against another part of the clamping member to clamp them together.

4. A clamp for clamping two scaffolding members together comprising a single U-shaped clamping member adapted to embrace one scaffolding member, said clamping member having the edges on one side recessed laterally to form two hook portions adapted to receive the other scaffolding member and having a slot in one of said hook portions, a chair formed with an extended arm slidably mounted in said slot adapted to permit the chair to be slid either into a position clear of the space between the two hook portions or into a position in between the said scaffolding members, a detachable end on said arm adapted when removed to permit the chair to be detached but when attached prevents the chair from sliding completely off the clamping member and a distancing device in the base of said clamping member for applying pressure between the scaffolding members and the clamping member to clamp them together.

5. A clamp for clamping two scaffolding members together comprising a single U-shaped clamping member adapted to embrace one scaffolding member, said clamping member having the edges on one side recessed laterally to form two hook portions adapted to receive the other scaffolding member and having a slot in one of said hook portions and a counter-sunk recess surrounding said slot on the interior of the clamping member, a chair formed with an extended arm slidably mounted in said slot adapted to permit the chair to be slid laterally from a position clear of the space between the two hook portions into a position in between said hook portions in which it is adapted to engage between the scaffolding members, a detachable end on said arm adapted to engage in said counter-sunk recess when the chair is clear of the space between the two hook portions said detachable end when removed permitting the chair to be detached but when attached prevents the chair from sliding completely off the clamping member and a distancing device in the base of said clamping member for applying pressure between the scaffolding members and the clamping member to clamp them together.

6. A clamp for clamping two scaffolding members together comprising, in combination, a U-shaped metal plate with its central part providing a semi-cylindrical portion adapted to embrace one scaffolding member and its two arms having their flat sides parallel to each other, said arms having lateral recesses in corresponding side edges whereby said U-shaped plate can be applied laterally to the other scaffolding member and a clamping device attached at one end of said U-shaped plate, the whole forming a unit, said clamping device being positioned to press the scaffolding members against each other and simultaneously toward and against the opposite end of the said plate.

DAVID HENRY JONES.